(12) United States Patent
Resnikoff et al.

(10) Patent No.: US 6,244,703 B1
(45) Date of Patent: Jun. 12, 2001

(54) METHOD AND APPARATUS FOR CALIBRATION OF AN ELECTRONIC VISION DEVICE

(76) Inventors: Nathaniel Resnikoff, 2130 Massachusetts Ave. #7E, Cambridge, MA (US) 02140; Howard L. Resnikoff, 85 E. India Row #35G, Boston, MA (US) 02110

(*) Notice: Subject to any disclaimer, the term of this patent is extended or adjusted under 35 U.S.C. 154(b) by 0 days.

(21) Appl. No.: 09/526,247

(22) Filed: Mar. 15, 2000

Related U.S. Application Data

(60) Provisional application No. 60/124,640, filed on Mar. 16, 1999.

(51) Int. Cl.[7] ................................. G02C 7/10; G02C 7/16
(52) U.S. Cl. .................................................. 351/44; 351/45
(58) Field of Search .............................. 359/630; 351/44, 351/45, 209, 210, 211

(56) References Cited

U.S. PATENT DOCUMENTS

| | | | | |
|---|---|---|---|---|
| 4,848,890 | * | 7/1989 | Horn | 351/44 |
| 5,671,035 | * | 9/1997 | Barnes | 351/45 |
| 6,056,397 | * | 5/2000 | Berlad | 351/44 |

* cited by examiner

Primary Examiner—Ricky Mack
(74) Attorney, Agent, or Firm—Foley, Hoag & Eliot LLP (57) ABSTRACT

A method for calibrating an electronic vision device, such as a personal glare reduction device, having a darkened spot in its field of view includes the steps of fixing the lens coordinates of the darkened spot to correspond to a calibration site in the field of view, and moving the glare reduction device to place the darkened spot in line with the glare source. A processor evaluates a correction angle on the basis of the new direction to the glare source, as measured by a directional light sensor on the glare reduction device. The apparatus of the invention includes a controller that includes the processor, a memory, a light sensor, and a user interface element.

18 Claims, 4 Drawing Sheets

METHOD AND APPARATUS FOR CALIBRATION OF AN ELECTRONIC VISION DEVICE

RELATED APPLICATION

This application claims priority to U.S. provisional application Serial No. 60/124,640, filed on Mar. 16, 1999, the contents of which are incorporated herein by reference.

BACKGROUND OF THE INVENTION

This invention relates to the field of glare reduction devices and other electronic vision devices. In particular, it relates to a method and apparatus for calibrating such a device to accommodate differences in facial geometry and other variations in the placement of a lens element of the device relative to the eye of a user.

When driving into the sun, the sun's glare frequently results in considerable discomfort to the driver. In some cases, the glare is so intense that the driver's pupils constrict to the point at which the rest of the field of view appears dark. This interruption in the driver's ability to see can arise without warning, for example when the driver turns a corner or goes around a bend, only to be greeted with the full force of the solar glare.

If the driver continues to drive, there is a significant risk of a collision arising from the driver's inability to see.

A personal glare reduction device has a lens medium that can be selectively darkened to at least partially cover a user's eye. Such a lens medium can, for example, employ the technology of an LCD display with individually addressable elements. A personal glare reduction device is typically coupled with a directional light sensor that determines the angular positions of bright light sources in the user's field of view. A processor obtains these angular positions and uses them to determine what points are to be darkened in order to prevent light from those light sources from reaching the user's eyes. The processor then automatically darkens the lens medium at those points through which light from the bright light sources passes on its way to the eye. This improves vision elsewhere in the user's field of view and reduces, if not eliminates, the onset of temporary blindness resulting from solar glare.

In order to locate the darkened portions of the lens medium correctly, it is desirable that a personal glare reduction device has accurate information as to the location of the lens element relative to the pupil of the user's eye. A common embodiment of a personal glare reduction device, which is one form of an electronic vision device according to the invention, is sunglasses, and other forms of eyeglasses. These embodiments have two optical windows, typically lens elements, one for each eye of the wearer. Because of both the natural variation in the way eyeglasses sit on people's faces and on the natural variations in eye spacing, it is desirable that a personal glare reduction device be provided with a calibration procedure. Such a calibration procedure is preferably intuitive and simple to perform.

U.S. Pat. No. 4,848,890 to Horn teaches a visor in which points on the visor are selectively darkened in response to the location of a light source. The Horn device includes a processor for identifying the angular location of a light source relative to the visor. In response to the angular location of the light source, the Horn device looks up a corresponding point or points in a look-up table, and darkens the visor at those points. However, no explicit means of adjustment is taught for calibrating the device to a particular user. Thus, in response to light incident from a particular angle, the Horn device darkens the same points on the visor without regard to any variations in the location of the visor relative to the user's pupil.

US Pat. No. 5,671,035 to Barnes teaches a light intensity reduction device containing a photosensitive element with a masking array to selectively darken output lenses for point-by-point light blocking. Barnes teaches a method for calibrating the device to an individual user by entering a programming mode in which the user manipulates a plurality of switches in an effort to direct a single darkened element on each lens to a position directly above the center of the eye.

One problem with the calibration method taught by Barnes is that it may be difficult for the user to determine exactly where the position directly above the center of the eye is. Even small errors in attempting to 'look straight ahead,' or in perceiving the location of the darkened element, can lead to inaccurate calibration. In addition, the method taught by Barnes is time-consuming and requires that the user perform physically demanding tasks such as holding the head perfectly steady while attempting to adjust the location of a small darkened region or spot using controls with which, given the frequency of calibration, a user is unlikely to be familiar. The hand-eye coordination required to calibrate the Barnes device successfully is thus comparable to that required to do well in many video-games.

It is thus a purpose of the present invention to provide a quick, simple, and accurate method of calibrating a personal glare reduction device and other electronic vision devices, and to provide corresponding apparatus.

Other objects of the invention will in part be obvious and will in part appear hereinafter.

SUMMARY OF THE INVENTION

One aspect of the present invention is a method for calibrating a personal glare reduction device having a darkened spot at a location defined by lens coordinates. A processor calculates the lens coordinates on the basis of the direction to the glare source, as measured by a directional light sensor associated with the glare reduction device. By frequently updating the lens coordinates in response to the direction to the glare source, the processor causes the darkened spot to track the glare source. Due to variations as in facial geometry or placement of the eyes relative to the device, the device may be out of alignment with the user's eye, causing the desired effect of the device to be compromised or absent. For this reason, it is necessary to calibrate the personal glare reduction device to account for differences in facial geometry.

The method of the invention includes the step of suspending the tracking function of the personal glare reduction device, thereby fixing the lens coordinates of the darkened spot at a calibration site. The user then turns its head so as to place the darkened spot in line with the glare source, thereby occluding the glare source with the darkened spot. The motion of the user's head results in a change in the direction to the glare source, as seen from the directional light sensor. The user then instructs the personal glare reduction device to evaluate a correction angle on the basis of this new direction angle to the glare source as measured by the directional light sensor.

In a preferred embodiment, calibration is made quick and intuitive by providing a user-interface having one or more buttons which, when pressed, signal the device to suspend its usual tracking of bright light sources and instead to keep the darkened spot fixed in place on the lens until the button is released. The user then turns its head so that the darkened spot on the lens occludes the glare source. With the glare source thus occluded, the user releases the button. This sends a signal instructing the processor to use geometrical relationships and the information from the directional light sensor to determine the amount of correction to the previous coordinate value.

Further, the method and apparatus of the invention adaptively calibrate an electronic vision device to a user who wears, mounts or otherwise locates a lens element of the device in front of an eye. The adaptive calibration according to the invention provides coordinate information that the EVDevice employs to match the placement of one or a pair of lens elements relative to one or both eyes of the user.

The method and apparatus of the invention are understood to be applicable to many types and forms of optical viewing devices. Examples include eye glasses (spectacles), sunglasses, goggles, ophthalmoscopes, microscopes, and other viewers and like displays. For clarity of description and without restriction on the scope of practice, the invention is described with particular reference to eyeglasses.

In general, an electronic vision device with which the invention can be practiced has at least one lens element, including a window or other viewing element, for placement in front of and proximal to an eye of a viewer. Each pixel on the lens element is addressable, and can manifest a dark spot, including a spot of selected reduced or enhanced opacity/transmission and/or selected color.

One example of such an EVDevice is eyeglasses for night driving, and which occlude bright lights of on coming traffic by producing dark spots on the two lenses. The device tracks the movement of oncoming lights, and moves the dark spots to attain a selected level of masking or occlusion, relative to the viewer. Optionally, the device also sizes and otherwise contours the dark spots to match the shapes and sizes of the lights, to enhance the degree of occlusion. In such an EVDevice, the location of each lens element relative to the associated eye of the user can vary spatially in three orthogonal directions, i.e. transversely sideways and vertically, and longitudinally along the distance from the eye, generally from the pupil of the eye. These variations can be due to the placement of the spectacles on the bridge of the user's nose, to facial geometry, and to other factors.

According to one practice of the invention, an EVDevice that is to produce a dark spot on at least one lens element, in the field of view (FOV) of one eye of a viewer, locates a dark spot on the lens element according to initial coordinates of the location of the user's eye relative to that lens. The initial coordinates can be pre-set, assumed, or otherwise previously stored values. In most instances, the initial coordinates are not correct, due to the above-mentioned spatial variation of the lens placement relative to the eye of a wearer.

The method and apparatus of the invention enable the user to adjust or calibrate the coordinate information, i.e. to change the coordinate information from the initial values, which typically correspond to an assumed lens placement, to corrected values that correspond to actual placement of the lens relative to the associated eye. For a binocular EVDevice, e.g. spectacles with left and right lens elements associated respectively with left and right eyes of the user, the method and apparatus of the invention can perform the foregoing corrective calibration (adaptive calibration) for one eye and associated lens and, on the assumption of sufficient symmetry, apply the same corrected values to the other lens and associated eye. An alternative practice of the invention involves determining corrective coordinate information independently for each lens, either sequentially or concurrently.

A method according to one practice of the invention determines a single coordinate of actual lens placement relative to an eye of a user, for example a vertical coordinate. The method assumes that the value of a second coordinate, for example, a horizontal one, is close to a given or otherwise preset value that is assumed to be correct. This practice of the invention hence adaptively calibrates an electronic vision device for a single coordinate only, preferably for a coordinate along an axis transverse to the eye-lens spacing, i.e. a transverse coordinate. The method assumes that a second transverse coordinate is correct, or is otherwise correctly available.

A method according to a second, alternative practice of the invention determines each of the two transverse coordinates to identify the actual lens placement relative to the eye of a user.

A method according to one practice of the invention provides the foregoing adaptive calibration of a single transverse coordinate, or of two transverse coordinates, for one lens-eye placement, and applies the same resultant adaptive calibration for the other eye lens placement, where the electronic vision device is binocular. In another practice of the invention, one or both transverse coordinates are determined independently for the actual placement of each lens relative to the associated eye.

A method according to the invention can combine adaptive calibration for one or both transverse coordinates, as discussed above, with a further coordinate, i.e. a coordinate longitudinal to the eye/lens spacing. The longitudinal coordinate can be determined in accordance with the invention, as discussed further below, either for a single eye and applied to both eyes of a binocular device, or alternatively independently determined for each eye and lens of a binocular electronic vision device. The practice of the invention also comprehends operations with an assumed or otherwise determined longitudinal coordinate for the eye lens spacing.

A further feature of the method of the invention is that it can determine any one, two, or three coordinates, in a three-coordinate system, for locating a dark spot or other visual marker on a lens element of an EVDevice, according to the actual location of that lens element relative to an eye of a user.

An electronic vision device according to the invention can be configured to operate according to any of the foregoing methods.

One feature of the method and apparatus of the invention is that it determines a geometrical vector for calibrating an electronic vision device. The vector is determined by and hence identifies the relative location of a lens element, including an input viewing window, of the device relative to an eye of the user. One practice of the invention determines the vector in two steps, the first of which determines only the direction of the vector. The second step determines the vector end points, which correspond to the pupil of the user's eye and to a location on the lens element having a known position relative to a reference position.

It is also a feature of the invention to determine only the direction of such a vector. In such a practice, other procedures, including calculation with one or more known or assumed values of coordinate information, determine the end points of the vector.

The invention accordingly comprises the several steps and the relation of one or more such steps with respect to each of the others, and comprises apparatus embodying features of constructions, combinations of elements and arrangements of parts adapted to effect such steps, all as exemplified in the following detailed disclosure, and the scope of the invention as indicated in the claims.

BRIEF DESCRIPTION OF DRAWINGS

For a fuller understanding of the nature and objects of the invention, reference is to be had to the following detailed description, in connection with the accompanying drawings, in which.

DESCRIPTION OF ILLUSTRATED EMBODIMENTS

Figure 1:
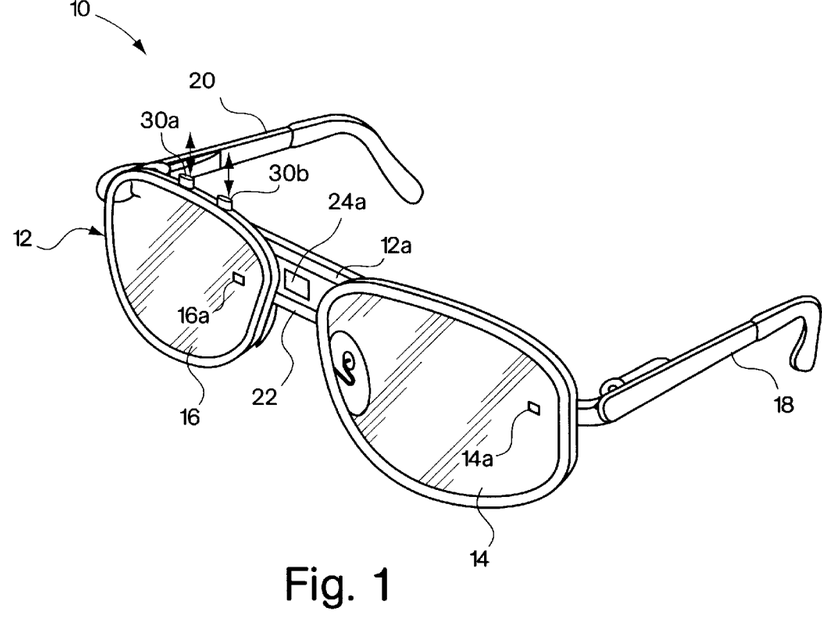
FIG. 1 is a diagrammatic view of an electronic vision device in the form of spectacles according to the invention.

FIG. 1 shows an electronic vision device 10 according to the invention in the form of spectacles with a frame 12 that mounts a left lens 14 and a right lens 16 and to which attach a left temple 18 and a right temple 20. Each lens 14, 16 has an array or field of addressable picture elements, i.e. pixels, and the opacity, i.e. light transmission, of the lens at each pixel can be controlled electronically. An electronic controller 22 mounted with the frame can form a dark spot at each pixel of each lens. Such a dark spot, for example, can block solar glare from the user's vision.

Figure 2:
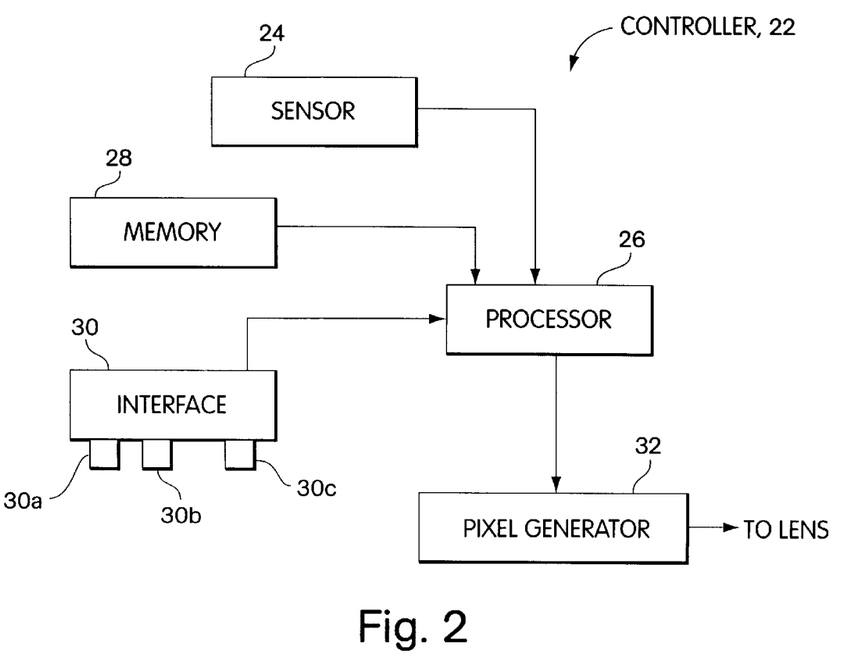
FIG. 2 is a schematic block diagram of a controller for the electronic vision device of FIG. 1.

The illustrated controller 22, as shown in FIG. 2, has a directional light sensor 24 mounted to the frame 12 and having an input aperture 24a that is preferably located proximal to and symmetrically with each lens 14 and 16. The illustrated sensor aperture is at the center of the bridge 12a of the spectacle frame 12. The directional light sensor 24 responds to each incident ray of light to produce direction signals identifying the relative orientation of the incident light ray. In one embodiment, the directional signals identify the direction of an incident light ray relative to a reference plane, illustratively a plane passing through the frame 12 and the lenses 14 and 16, e.g. the plane of the drawing of FIG. 3A. One preferred sensor 24 has an array of opto-electric transducing elements, each of which corresponds to one pixel on each lens 14, 16.

Optional additional capabilities of the directional light sensor 24 are to sense the relative brightness of the incident light ray, the color of the incident light energy, and the relative size of the source of the incident light.

The illustrated controller 22 has a digital computer processor 26 that receives the direction signals and any other light-responsive signals from the sensor 24. Other inputs of the controller are connected with a memory 28 in which the processor can, for example, store coordinate information. The processor 26 applies command signals to a pixel generator 32 in the controller 22. In response, the pixel generator applies signals to one or both lenses 14 and 16 to control the optical transmission, e.g. opacity, and optionally the color, of each pixel of each lens. FIG. 1 shows one such darkened pixel 14a and 16a on each lens.

The illustrated controller 22 further includes an interface 30 connected with the processor 26 and having user input controls, of which two designated 30a and 30b are illustrated. In the illustrated spectacle device 10 of FIG. 1, each interface input control 30a and 30b is a manually operated switch, e.g. a button, mounted on the spectacle frame 12 and independently manually accessible by the user. An optional further interface input 30c can be a keyboard device, input port, stylus tablet, or other interface component for entering information, such as a selected coordinate value or otherwise, to the controller 22.

The elements of the controller 22, including the construction and operation of each with the others, employ skills known in the art for practicing the adaptive calibration as described herein. Examples of this technology include radar systems that track and display aircraft, and liquid crystal displays for computer monitors and for video games, among numerous others.

Figure 3A:
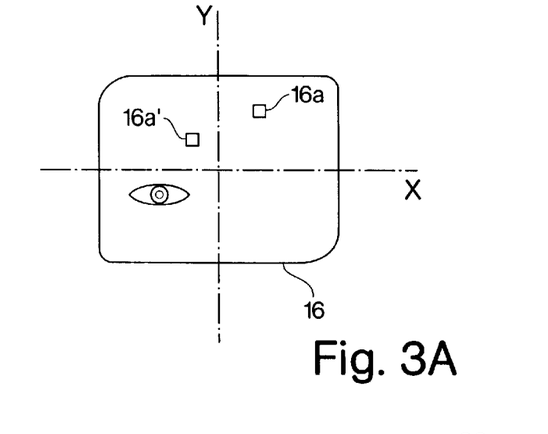
FIGS. 3A, 3B, and 3C, respectively, are front plan, side elevation, and top elevation schematic views of a single lens of an electronic vision device, as shown in FIG. 1, in accordance with the invention.

FIG. 3A shows one lens, illustrated as the right lens 16 (right to the user and left in the view of FIG. 1) with a dark spot 16a at a pixel location having a specified address identified with initial coordinate values. The processor 22 initially located the dark spot 16a with the initial coordinate information premised on the right eye of the wearer being directly behind a selected reference location on the lens 16. In the illustrated embodiment, the initial premise is that the eye is directly behind the optical center of the lens 16, i.e. aligned with the intersection of the X and Y axes of FIG. 3A. FIG. 3A further shows that the actual location of the eye is offset from that optical center. It is illustrated as below and to the left in FIG. 3A. Hence, the correct placement of the dark spot, for example for a desired occluding of solar glare, is at a corrected location 16a' on the lens 16.

Figure 3B:
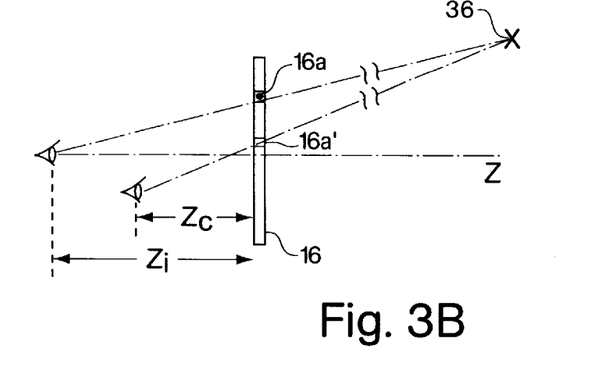
Figure 3C:
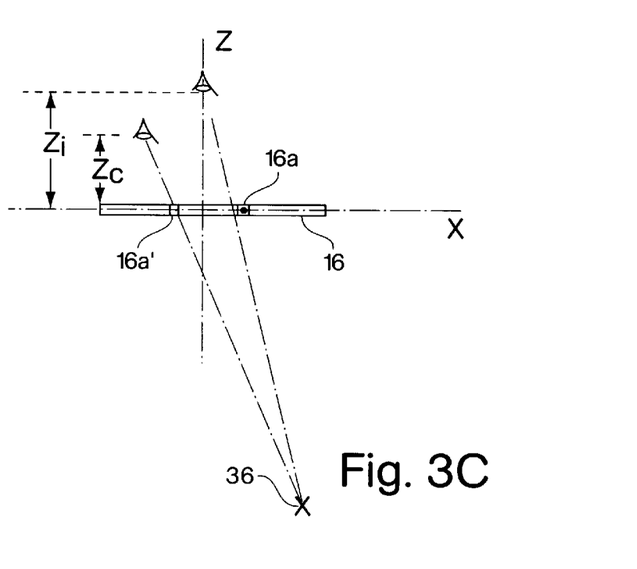

Further, as FIGS. 3B and 3C show, the processor 22 initially located the dark spot 16a at initial coordinates on the lens 16 premised on the right eye of the user being at a distance designated $z_i$, along a longitudinal z axis. The actual location of the eye from the lens 16 of the device 10 in the illustrated example is, however, a lesser distance designated $z_c$.

In operation according to the invention, after the user puts on the spectacles of FIG. 1, to thereby locate each lens relative to each eye of the user, the user looks at a light source 36, i.e. places it in the field of view of one or both lenses. The sensor 24 of the controller 22 responds to light from the source 36 and applies resultant directional signals to the processor 26. In response to those direction signals and to the assumed relative eye position signals, for example as stored in the memory 28, the processor 26 produces signals that operate the pixel generator 32 to display the dark spot 16a at the position shown in FIGS. 1 and 3A. FIGS. 3B and 3C show that the resultant dark spot 16a on the lens 16 indeed occludes the ray of the light source 36, which is at a relatively distant location from the eye on the lens, and is hence an optically distant source, from an eye at the presumed location on the intersection of the x and y axes and at the initial, assumed distance $z_i$ along the z axis.

However, due to the actual placement of the eye at a location different from that presumed location, as shown in FIGS. 3A, B, and C, the dark spot 16a does not occlude the light source 36 from the eye at its actual location. That actual location is offset from the origin of the transverse x and y axes as appears in FIG. 3A, and is spaced from the lens at the distance $z_c$ as appears in FIGS. 3B and 3C.

The user initiates operation to update the controller 22 to this actual location of the user's eye relative to the lens 16 by actuating the interface control 30a. The resultant interface signal switches the processor 26 from the foregoing initial condition to a first adaptive condition. A first step of the processor 26, in the adaptive operation, is to fix the dark spot 16a on the lens at the initial position. The user then moves its head, which moves the eyes and the lenses, as well as the sensor aperture 24a, together as a unit, to align the dark spot 16a with the light from the source 36, e.g. to occlude the light source from view.

With its head oriented to thus position the dark spot to occlude the distant light source 36, the user actuates the processor 26, by way of the interface 30, for example, by releasing the input control 30a. The resultant interface signal to the processor, with the user head and the device 10 thus oriented for the selected alignment, directs the processor to employ the corresponding directional signal from the directional sensor 24 for further calibration. In particular, in response to the difference between the initial, assumed-position directional signal and this second alignment-responsive directional signal, the processor determines a line in space through two points, namely through the dark spot 16a and the actual placement of the user's eye. Thus, the foregoing steps of the method of the invention, as performed with the controller 22 and at least one lens element of the device 10, reduce the three-dimensional space of possible locations of the eye relative to one lens element, to a one-dimensional space, namely points on a line.

An alternative analysis is that the foregoing steps of the method of the invention determine, in the illustrated embodiment, the orientation of a geometrical line in space that passes through the visual marker and an eye of the user.

This geometrical line can be viewed as the direction of a vector. One end point of the vector is the eye pupil of the user. The other end point is the visual marker 16a on the lens element, e.g. the dark spot. More generally, the other vector end point is a location on the lens element 16 having a known position, e.g. relative to the x,y axes of FIG. 3. The foregoing operation is deemed a first phase of calibration according to the invention. A second phase described below is one, among others, for determining the vector end points.

One alternative to responding, as described above, to the difference between the initial and the second alignment signals, is for the processor to respond to the directional signal relative to a given reference plane such as the plane of the lens 16 in FIG. 3A.

In a further alternative practice of the invention, the controller 22 is programmed to display the dark spot 16a on the lens 16 at the initiation of the first adaptive condition at a predetermined location on the lens, that is deemed favorable, unrelated to previously set values.

The foregoing operation of the EVDevice 10 can, among other alternatives in accord with the invention, provide the dark spot 16a as a spot of selected brightness, color, or other visually perceptible parameter. Further, the operation can locate such a dark spot, or other visual marker, in a selected alignment with the distant object other than registration that occludes the object from the eye of the user. Examples of such other selected alignments of the visual marker include locations directly above or below or beside the distant object, and include a visual marker in the shape of a circle or annulus disposed concentric with the object, among numerous others.

In further accord with the invention, the controller 22 can determine one or more coordinates of the placement of the lens element 16 relative to the user's eye with a second phase of calibration measurement. The user typically initiates the second phase by way of an input control 30a, 30b of the interface 30. In response to such signaling, the processor 26 of the illustrated controller 22 progressively changes the value of one spatial coordinate. This operation generally moves the spot 16a on the lens element 16. The operation can, instead change the size of the spot, particularly if the spot is located directly in front of the user's eye. The operation thus adjusts the spot 16a, by moving it and/or by changing its size. The user observes this adjustment of the spot or other visual marker and can control the progressive coordinate change, and can signal when the visual marker is in an optimal desired placement on the lens element 16. Although the user can select which spatial coordinate the controller is to change, the invention typically is practiced with the controller 22 preset to change the coordinate along the longitudinal axis, i.e. the z coordinate illustrated in FIGS. 3B and 3C. This second phase of operation is analogous to focussing a camera or binoculars, or to adjusting a zoom lens. A particular example known in the art is to adjust a motorized camera zoom lens, with the photographer controlling one or more adjustment buttons to attain the desired zoom setting of the camera lens.

In an optional practice of the invention as illustrated in FIGS. 2 and 3, the interface controls 30a and 30b enable the user to control, i.e. selectively change, the direction in which the controller 22 changes the value of a designated coordinate, i.e. whether it increases or decreases the value of that coordinate. Further, the interface 30 with controls 30a, 30b optionally enables the user to select the rate of change, i.e. to speed up or slow down the change.

The user signals the controller to stop the coordinate change when the user's vision perceives that the spot 16a or other visual marker has attained an optimal visual desired placement relative to a distant object or other object in the field of view. The processor then stores coordinate information for attaining that condition.

The EVDevice 10 with the controller 22, as illustrated in FIG. 2, thus performs the second calibration phase to establish the location of the eye of the user relative to the placement of one or both lens elements 16, 14 along each geometrical line determined as described above in the first phase of the measurement calibration.

In one preferred and nonlimiting practice of the invention where the EVDevice 10 is sunglasses or a night vision or like device, upon completion of the second phase, in response to the user signaling the attainment of the desired optimal visual placement of the marker, the control of the visual marker, e.g. of the dark spot 16a, is no longer fixed as during the duration of the first calibration phase or moved only in response to the selected adjustment operation of the second phase. Instead, the controller 22 positions the marker 16a on the lens element 16, and moves it to track the movement of the distant object relative to the eye of the user. The controller 22 thus moves the marker equally for movement of the distant object and for movement of the user's head, as well as for a combination of these movements.

One alternative to the previously described second phase is for the controller 22 to use a value for one of the three coordinate parameters, typically for the distance along the longitudinal axis, i.e. the z coordinate, as stored or as determined with a procedure other than as set forth above. The stored parameter value can, for example, be the last value or a preset value.

The invention thus provides method and apparatus for calibrating an electronic vision device when as many as three spatial coordinates, of the placement of a lens element of the device relative to the eye of a user, are unknown. The calibration can be understood to involve two phases of operation, as described above. The calibration typically defines the lens-eye placement with coordinates referenced to the EVDevice, e.g. with reference to the coordinate system and reference plane of FIG. 3A. The invention includes practices to determine fewer than three coordinates, as further described below with reference to the device 10 of FIGS. 1 and 2 and to FIGS. 4A, B, C, and D.

Determine x & y, Given z

Figure 4A:
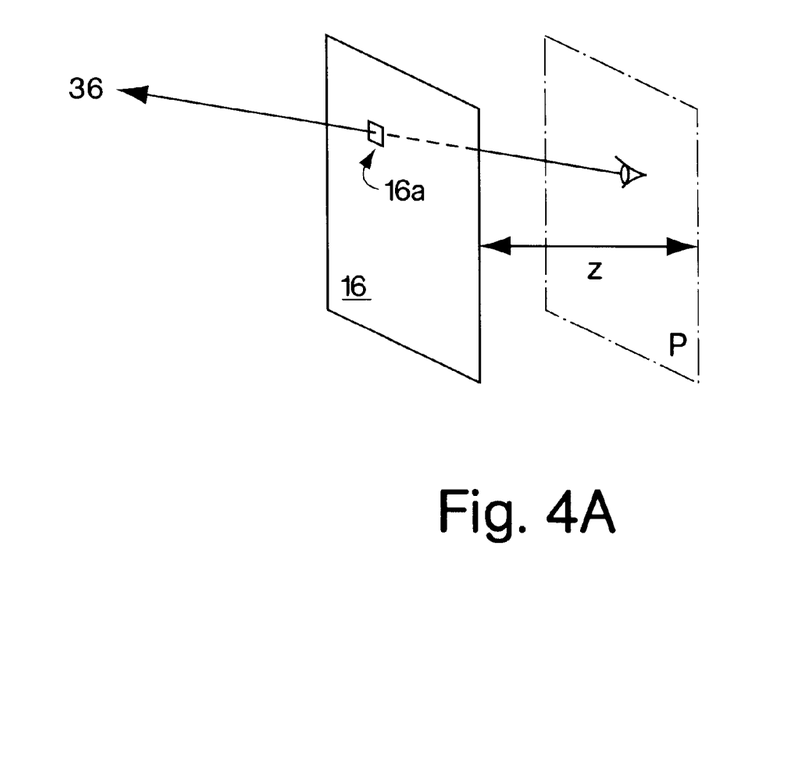
FIGS. 4A, 4B, 4C, and 4D are diagrams further illustrating calibration operations in accord with the invention.

FIG. 4A shows one lens, illustrated as the right lens 16 as in FIG. 3A, with a dark spot 16a at a pixel location having a specified address identified with initial coordinate values. In one practice of the invention, the controller 22 has a value for the longitudinal coordinate z which is assumed correct or otherwise correctly available. Thus the user's eye is known to be in an imaginary plane P which is parallel to a reference plane which, for clarity of description, is illustrated as the plane of the lens 16. A line passing through the dark spot 16a on the lens 16 and the user's eye only intersects the plane P at a single point. Thus the steps of the method in the aforementioned first phase of calibration measurement, together with the given value of z, are sufficient for the controller 22 to determine the remaining transverse coordinate values.

Determine x & z, Given y

Figure 4B:
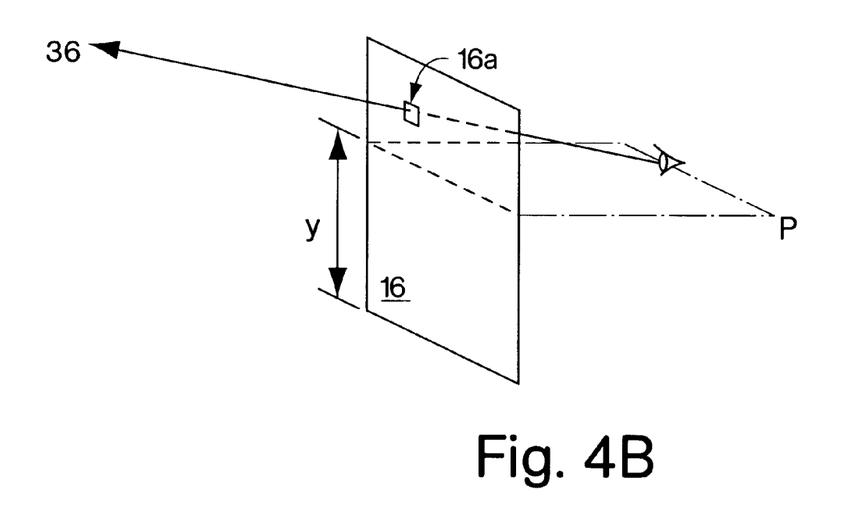

FIG. 4B shows an alternative practice of the invention in which a transverse coordinate y of the actual position of the user's eye is assumed correct or otherwise correctly available. Knowledge of the value of y restricts the possible positions of the user's eye to an imaginary plane P orthogonal to the plane of the lens 16. If the user selects any initial position for the distant object 36, e.g. a light source, which is not in the plane P, then the dark spot 16a is not on the line defined by the intersection of the planes P and the lens 16. In this practice, a line passing through the dark spot 16a only intersects the plane P at a single point. Thus the steps of the method in the aforementioned first phase of calibration measurement, together with the known value of y, are sufficient for the controller 22 to determine the values of the other transverse coordinate and of the longitudinal coordinate.

Determine y & z, Given x

The corresponding practice where the transverse coordinate x, orthogonal to y as above, is assumed correct or otherwise correctly available, is identical to the procedure described above with reference to FIG. 4B, where the steps of the method include the user positioning the light source 36 away from the line which is the intersection of the plane of the lens 16 and the plane representing the range of possible values for the actual position of the user's eye, given knowledge of the transverse coordinate x.

Given x & z or y & z, Determine Remaining Coordinates

Figure 4C:
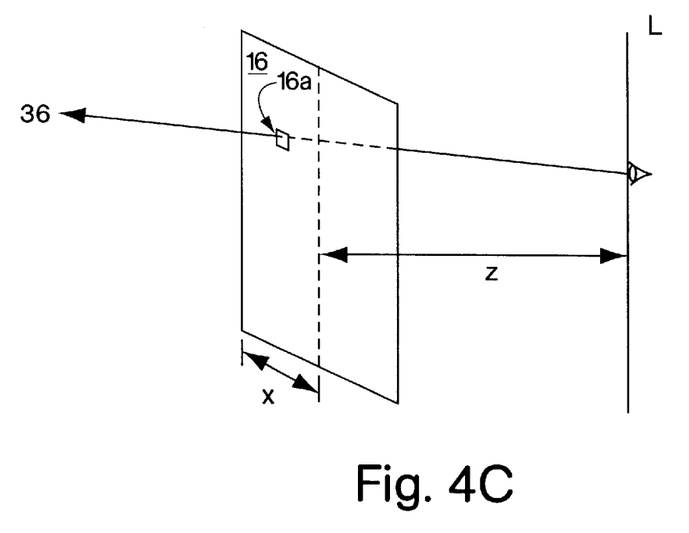

FIG. 4C shows an alternative practice of the invention in which a transverse coordinate, which for example is designated x, and the longitudinal coordinate z are assumed correct or otherwise correctly available. Knowledge of these two coordinates restricts the possible positions of the user's eye to a line L parallel to the plane of the lens 16 at a distance z, and parallel to the axis of the unknown transverse coordinate. A line passing through the dark spot 16a on the lens 16 and the user's eye intersects the line L at only a single point. Thus the remaining transverse coordinate value can be found using the aforementioned first phase of calibration measurement together with the known values of x and z. Alternatively, the remaining transverse coordinate may be determined using the aforementioned second phase of calibration measurement, where the controller 22 progressively changes the value of the unknown transverse coordinate.

Determine z, Given x & y

Figure 4D:
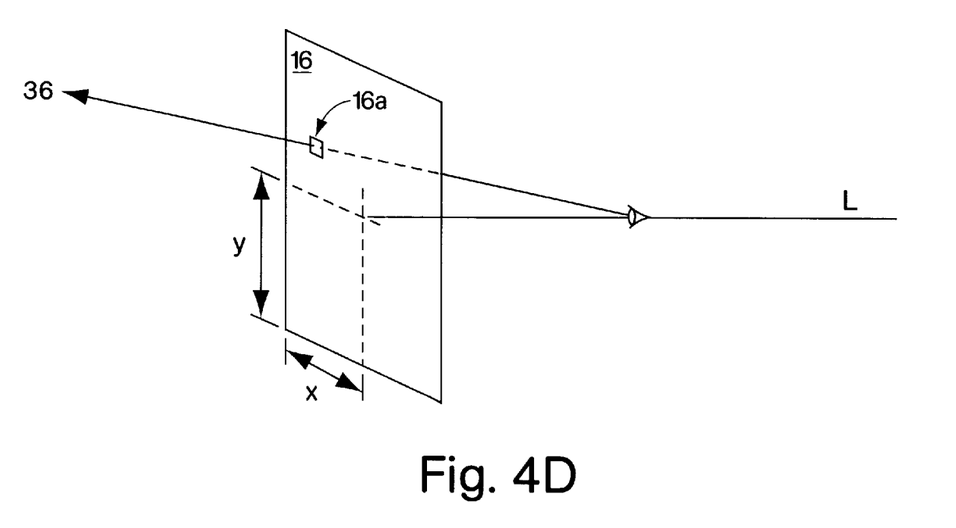

FIG. 4D shows an alternative practice of the invention in which the two transverse coordinates are assumed correct or otherwise correctly available. Knowledge of the transverse coordinates restricts the possible positions of the user's eye to a line L passing through the user's eye and orthogonal to the plane of the lens 16. If the user selects any initial position for the light source 36 that is not in line with the line L, then a line passing through the dark spot 16a intersects the line L at only a single point. Thus, the steps of the method in the aforementioned first phase of calibration measurement, together with the known values of the transverse coordinates, are sufficient for the controller 22 to determine the value of the longitudinal coordinate. Alternatively, the aforementioned second phase of calibration measurement can determine the longitudinal coordinate.

It will thus be seen that the invention efficiently attains the objects set forth above. Since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all generic and specific features of the invention described herein, and all statements of the scope of the invention which as a matter of language might be said to fall therebetween. Having described the invention, what is claimed as new and secured by Letters Patent is:

1. A method of adaptively calibrating an electronic vision device to selected alignment with at least one eye of a user, said method comprising the steps of sensing the relative directional location of a object in the field of view of the user and producing directional signals in response thereto, producing, on an addressable lens element positioned in the field of view of the user and in response to the directional signals, a visual marker at a location having initial coordinates to place the marker in selected visual alignment with the object, for an assumed position of the user's eye relative to the lens element, moving the field of view of the user and the lens element together, to bring the marker into a selected alignment with the distant object for the actual position of the user's eye relative to the lens element, and determining updated coordinates responsive to placement of the visual marker relative to the actual position of the user's eye.

2. A method according to claim 1 in which said determining step determines updated coordinates in response to the spatial displacement of the visual marker between attaining said selected alignment for the assumed position and attaining said selected alignment for the actual position.

3. A method according to claim 1 wherein said movement of the field of view of the user and of the lens element is in at least one direction transverse to the distance to the detectable object.

4. A method according to claim 1 wherein said step of producing a visual marker at a location having initial coordinates responds to an assumed position of the user's eye relative to the lens element both along at least one transverse axis and along a longitudinal axis, where said axes are oriented relative to a reference plane, and wherein said step of determining updated coordinates responds to actual position along at least one said axis and to position information, either assumed or determined, along said other axis.

5. A method according to claim 4 further comprising the step of determining further updated coordinates in response to actual position along said other axis.

6. A method according to claim 1 wherein said step of producing a visual marker at a location having initial coordinates responds to an assumed position of the user's eye relative to the lens element along at least a vertical axis and along a longitudinal axis, where said axes are oriented relative to a reference plane, said step of determining update coordinates determines an update coordinate along the vertical axis, and further comprising the step of repeating said step of determining update coordinates to determine an update coordinate along a horizontal axis.

7. A method according to claim 1 further comprising the steps of tracking the relative directional location of the detectable distant object in the field of view of the user and producing tracking directional signals in response thereto, and moving the location of the visual marker on the lens element in response to said tracking directional signals.

8. A method according to claim 1 comprising the further steps of providing a user interface for entering a selected marker command signal and adjusting a parameter of the marker on the lens in response to the command signal.

9. A method according to claim 8 wherein said parameter is selected from the group of parameters including shape, size, brightness, and color of the visual marker, and said adjusting of the marker adjusts a parameter of the marker selected from the said group of parameters.

10. A method according to claim 1 comprising the further steps of sensing a parameter of the distant object other than directional location, and producing a parameter-responsive signal, and adjusting the visual marker produced on the lens element in response to the parameter responsive signal.

11. A method according to claim 10 wherein said parameter is selected from the group of parameters including shape, size, brightness, and color of the distant object, and said adjusting of the marker adjusts a parameter of the marker selected from the said group of parameters.

12. A method according to claim 1 in which said determining step includes defining a geometrical line in space extending through the marker and an eye of the user.

13. A method according to claim 12 in which said determining step includes the further step of determining the placement of the lens element relative to the eye of the user, along said geometrical line.

14. Apparatus for adaptively calibrating an electronic vision device to selective alignment with at least one eye of a user, said apparatus comprising a lens element adapted for producing thereon a visual marker at an addressable location, a direction sensor mounted with said lens element and producing directional signals in response to sensing the relative directional location of a detectable distant object in the field of view of the user through the lens element, a lens controller having a first operating condition in which it is responsive to directional signals to produce on said lens element a visual marker at a location having initial coordinates that place the marker in selected visual alignment with the distant object, for an assumed position of the user's eye relative to the lens element, and having a second operating condition in which it maintains said visual marker on the lens element in said location and responds to further directional signals for determining updated coordinates in response to the spatial displacement of the visual marker to attain a selected alignment of the marker relative to the distant object, for the actual position of the user's eye relative to the lens element.

15. Apparatus according to claim 14 wherein said lens controller in said first condition produces said visual marker at a location having initial coordinates responsive to an assumed position of the user's eye relative to the lens element both along at least one transverse axis and along a longitudinal axis, where said axes are oriented relative to the direction to the detectable object, and wherein said lens controller in said second condition determines said updated coordinates in response to actual position at least along one transverse axis.

16. Apparatus according to claim 15 wherein said controller has a third operating condition in which it determines further updated coordinates in response to actual position of the lens element relative to the eye of the user along said longitudinal axis.

17. Apparatus according to claim 16 further comprising a user interface connected with said lens controller and responsive to user-initiated action to place the controller in any selected one of said operating conditions.

18. Apparatus according to claim 17 in which said lens controller repositions a visual marker on the lens element in response to updated coordinates.

* * * * *